April 7, 1925.                           1,532,886
I. COWLES
HOSE COUPLING
Filed Feb. 4, 1921          2 Sheets-Sheet 2
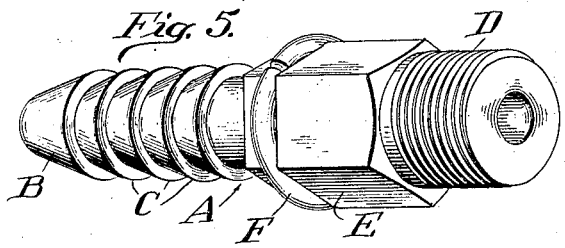
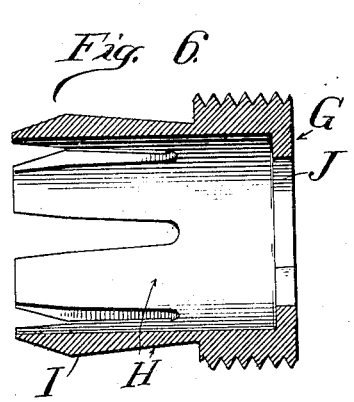
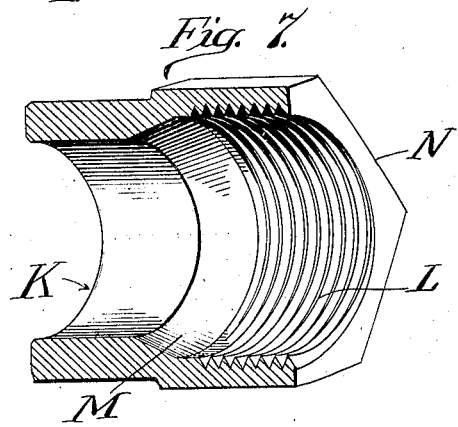
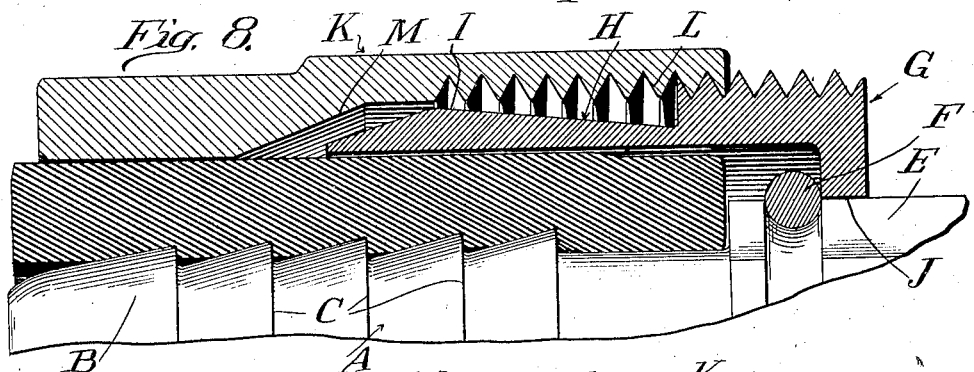
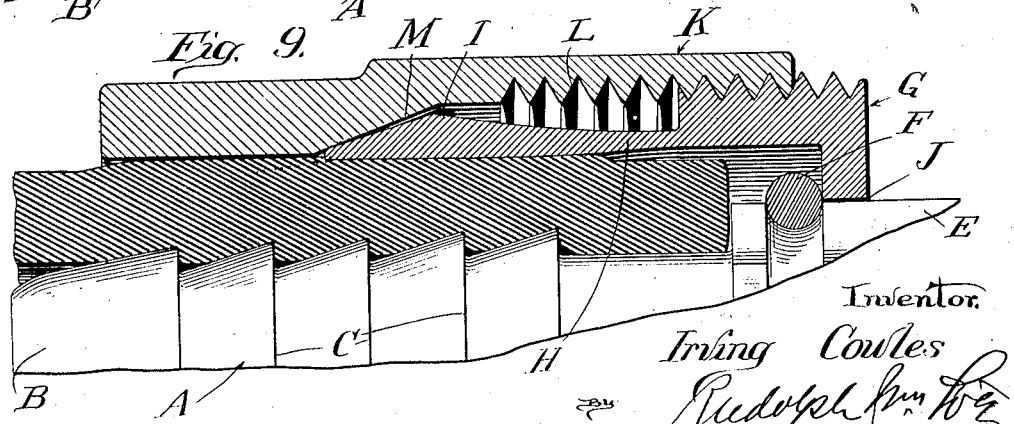
Inventor.
Irving Cowles Patented Apr. 7, 1925.

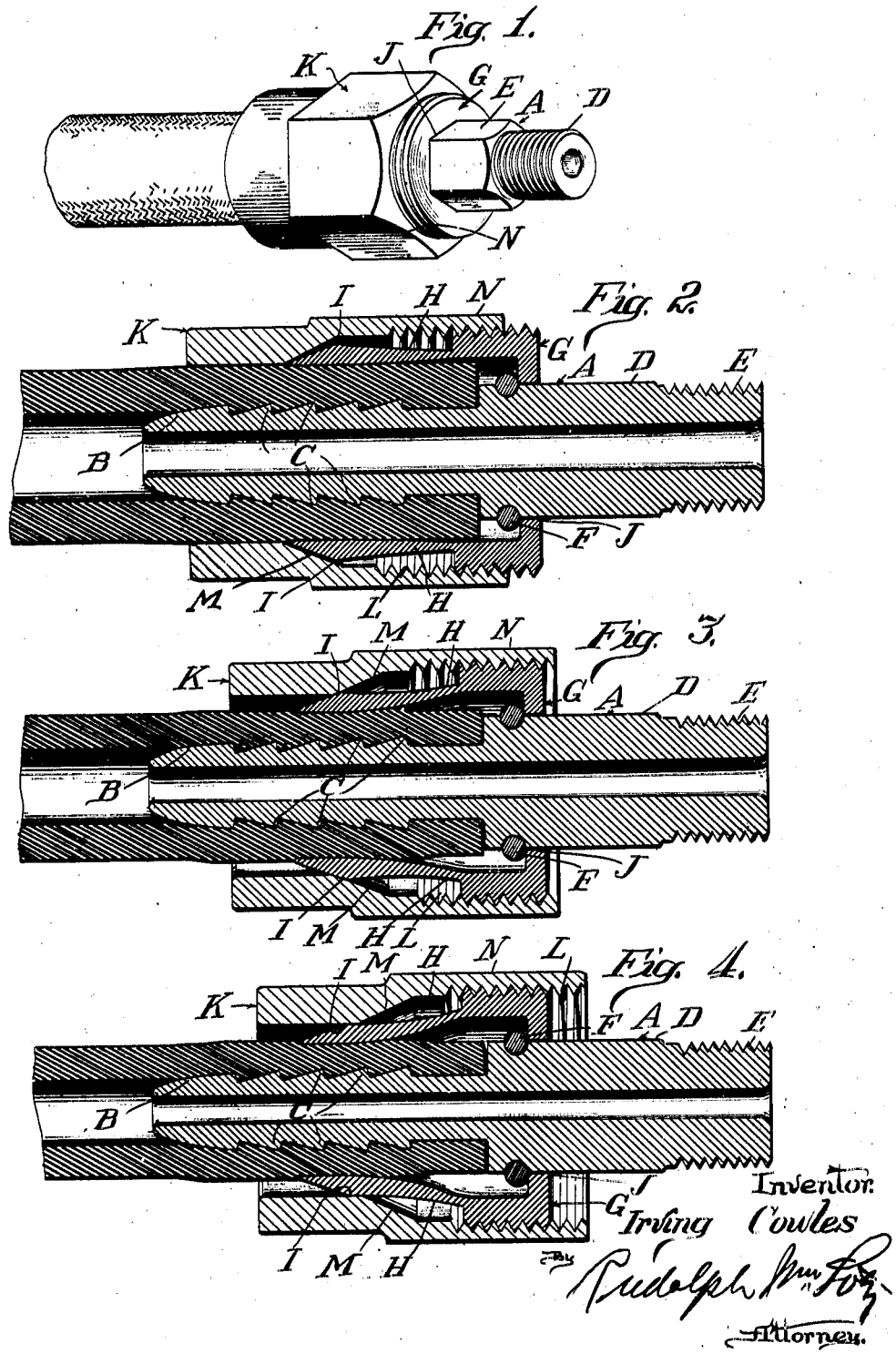

1,532,886

UNITED STATES PATENT OFFICE.

IRVING COWLES, OF CHICAGO, ILLINOIS.

HOSE COUPLING.

Application filed February 4, 1921. Serial No. 442,565.

*To all whom it may concern:*

Be it known that I, IRVING COWLES, a citizen of the United States, residing at Chicago, in the county of Cook and State of Illinois, have invented certain new and useful Improvements in Hose Couplings, of which the following is a specification.

This invention relates to improvements in hose couplings, also sometimes referred to as hose clamps, and has for its particular object to provide a device of this character which will fit flexible hose of a number of different sizes and wherein the clamping effect is produced in an efficient and novel manner over a comparatively large surface of the circumferential wall of the hose.

A further object of the invention is to provide a device of this character which may be mounted on the hose without subjecting the latter to any tortional or frictional strain such as is apt to break or mar the exterior surface thereof.

A further important object of the invention is to provide a device of the character aforesaid which is adapted for engaging and efficiently clamping upon the stem inserted into the bore thereof, hose of quite a variety of different external diameters, and, further, to render a given size of external clamping means interchangeable with a number of stems of varying diameters. Thus, for example, a given size of external clamping means, such as one inch diameter, capable of efficiently engaging hose down to three-quarter inch outer diameter, may be associated with any one of a series of stems varying from three sixteenths inch to one half inch, according to the bore diameter of said hose. And reversely, a stem of given diameter may be used with a variety of sizes of external clamping means, the advantage resulting from these wide ranges, lying in the fact that the dealer is enabled to supply practically every want of the customer from a far smaller stock on hand than he has been heretofore obliged to carry, the interengaging portions of stems and clamping means constituting the constant for the entire series.

A further object of the invention is to provide a hose-clamp or coupling possessing all of the advantages above enumerated which possesses the further advantage of having every part thereof capable of being produced very cheaply by means of automatic screw-machines and punch presses with the resultant advantages of cost economy and finished appearance.

The foregoing objects include that of so associating the parts of the clamp with the hose that the tension tending to pull the stem and outer clamping elements apart is borne mainly in the outer wall thereof to thereby most effectually resist the tearing away of the hose from the clamp and avoiding injury to the hose resulting therefrom; and to so associate the stem with the other elements as to permit the former to adjust itself to a position slightly eccentric to the outer elements in accordance with slight inaccuracies commonly occurring in wall thicknesses of flexible hose and thereby assure uniform clamping pressure upon the entire portion of the hose disposed within the clamping zone.

The invention is illustrated in its preferred form in the accompanying drawings, in which Fig. 1 is a perspective view of a hose clamp or coupling constructed in accordance with the invention showing the same mounted at one end of a piece of flexible hose;

Figs. 2, 3 and 4 are respectively central longitudinal sections of the coupling and the hose showing the same coupling applied to various sizes of hose;

Fig. 5 is a perspective view of one member of the hose clamp or coupling;

Fig. 6 is a central longitudinal section of the flexible clamping element of the device;

Fig. 7 is a perspective central longitudinal section showing the element coacting with that shown in Fig. 6 for effecting a clamping of the hose;

Figs. 8 and 9 are fragmentary enlarged detail central longitudinal sections of the coupling or clamp to more definitely illustrate the precise action thereof in use.

The coupling comprises the stem shown in detail in Fig. 5, which comprises a stem A of usual construction adapted to enter the end of the hose. Such stem has a tapered end portion B and a plurality of sharp circumferential ribs C adapted to engage the inner surface or inner circumferential wall of the hose. Said stem is further slightly tapered throughout its length, as more particularly shown in Figs. 8 and 9, so as to expand the end portion of the hose gradually during insertion of said stem.

The other end of said member is externally threaded for effecting connection of the hose with a pneumatic tube or the like, and between the stem A and the threaded portion D said member is hexagonal and annularly enlarged as indicated at E. Between the ends of said hexagonal portion there is an annular groove into which a split ring F is sprung which constitutes an annular shoulder or collar.

The member G shown in detail in Fig. 6 comprises an externally threaded sleeve terminating at one end in a plurality of longitudinally projecting flexible fingers H, each of which is of greater thickness adjacent its free end than at its point of connection with the threaded portion of the sleeve. Thus each finger or projection is provided with a ridge or shoulder I from which the stem is tapered to its free end. The inner surfaces of the fingers together constitute or provide a cylindrical or substantially cylindrical surface flush with the inner diameter of the threaded portion of said sleeve. The latter is provided at its other end with an end wall provided with a central hexagonal opening J corresponding substantially in dimensions with the hexagonal portion E of the stem. Said hexagonal portion and the threaded portion are adapted to be passed through said opening J so that the split collar F rests upon the inner surface of the metal bordering this said hexagonal opening J. Obviously, when so relatively disposed the said sleeve G and stem are rendered non-rotatable relatively to each other. The sleeve G, with its end wall, may be said to constitute a cup.

The end portion of the flexible hose mounted upon the stem A will pass so as to project into said cup and in engaging relation to the flexible fingers H, as more particularly illustrated in Figs. 2 to 4 and 9, inclusive. Before the stem and hose is inserted, as last above described, the sleeve K is mounted on the hose and after insertion is moved to engage the internal threads L thereof with the threads of the sleeve G. Between its ends the sleeve K is provided with a tapered portion M, the angle of which corresponds substantially to the taper of the outer or free end portions of the fingers H, so that as said sleeve is moved into engagement with the sleeve G by continued rotation thereof the said tapered portion M will engage the outer tapered portions of said fingers H and effect contraction thereof upon the exterior surface of the hose, thus forcing the latter into very strong surface contact with the hose and clamping the latter firmly upon the stem A. This clamping is effected usually by engaging the hexagonal portion E of the stem and the exterior hexagonal portion N of the sleeve K with wrenches whereby to hold one of said parts against rotation while rotating the other relatively thereto.

The fingers or projections H are most flexible adjacent their points of connection with the body portion of the sleeve G so that as the sleeve K is moved in the last named direction the free end portions of said fingers, which are relatively inflexible, will be forced down upon the hose so as to effect engagement of the relatively flat inner surfaces of said fingers or projections with the surface of the hose while said inner surfaces are maintained in or brought into a final position to still present a substantially cylindrical surface of considerable length. In other words, the flexibility of the shank portions permits the free end portions to accommodate themselves to the contour of the opposed hose surface. Obviously, as contraction of the fingers is effected, flexion of the latter will take place at the point or points of greatest flexibility thereof, and this permits a coupling adapted particularly for a half-inch hose to be used also for a three-eighths inch and one-quarter inch or intermediate sizes without varying the dimensions of the coupling in any manner except as to the external diameter of the stem A which must obviously be varied in accordance with variations in the inner diameter of the hose. This is clearly illustrated in Figs. 2 to 4 inclusive. Fig. 2, for example, may be taken to show the coupling as applied to a half-inch hose, and it will be noted that in this figure the inclined or tapered inner surface of the sleeve K bears for almost its entire length upon the outer tapered end portions of the fingers. When moved further the said fingers will be forced down into the surface of the hose to any desired extent but the surface contact will be over a considerable length of the surface of the fingers. When applied as shown in Fig. 3 to a hose of smaller diameter it will be noted that the tapered inner portion of the sleeve K becomes disposed at a higher elevation upon the fingers and adjacent to the ridges I thereof. It will be noted in this figure that the fingers are flexed adjacent their junction with the body of the sleeve G to ogee curves and that the inner surfaces thereof for a distance substantially equal forward and rearward of the plane of the ridges I bear flatly upon the surface of the hose.

In Fig. 4 is illustrated the adaptation of the coupling to the smallest size hose capable of being clamped thereby, and in this figure it will be noted that the tapered inner portion of the sleeve K has passed the plane of the ridges I and bears upon the fingers rearwardly thereof as well as upon said ridges to a certain extent. The flexed portion of the fingers now present a tapered surface which will be borne upon by the outer or portion of smallest diameter of the inner taper of the sleeve K, so that a continued movement of the latter upon the sleeve G will effect a further clamping or contraction of said fingers upon the hose.

The invention consists in part essentially in the relative formation of the fingers and the sleeve K to provide the coaction above described whereby the coupling is adapted for hose of various diameters, and also in the mode of associating or coupling the stem with the sleeve G whereby the clamping of the hose may be effected without effecting any torsion or other injurious strain on the hose, and without cutting or impairing the outer covering of duck, knitted fabric or wire-cloth very commonly found on the high pressure hose for which this coupling is particularly intended and adapted.

As is clearly evident from the drawings, there is a great advantage incident to this construction which is quite as important as those hereinbefore enumerated, and this lies in the fact that the several members of the clamp are easily turned out by automatic screw-mechanisms as to all work except that of cutting the hexagonal opening in the end wall of the sleeve G and the slots between the fingers H. The sleeve K and the stem A are turned from hexagonal rod and the sleeve G out of round rod. This makes manufacture of the coupling very cheap and the few parts makes it very convenient to use.

The split ring mounted on the hexagonal part of the stem is very advantageous in that it transmits the strain resulting from high pressure within the hose and from manual tension on the latter sometimes occurring in use of such hose, to the member G and thus obviates the tendency to withdraw the stem from the hose, it being obvious that in the absence of said collar, tension on the hose might result, in extreme cases, in withdrawing said stem to the irreparable injury of the hose.

While I have shown the preferred embodiment of the invention in the accompanying drawings, it will be understood, of course, that such embodiment may be changed and varied in details without departure from the invention as defined in the appended claims.

I claim as my invention:

1. A hose-clamp or coupling including a member terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and very flexible shank-portions to thereby permit the said free end portions to be moved a substantial distance bodily radially to engage hose of considerable different outer diameters while the inner faces of said fingers are maintained in position to present a substantially cylindrical surface common to all thereof.

2. A hose-coupling including a substantially cylindrical externally grooved stem adapted to enter the end of a hose, a member terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and very flexible shank-portions to thereby permit the said free end portions to be moved bodily radially to engage hose of considerably different outer diameters while the inner faces thereof are maintained in position to present a substantially cylindrical surface common to all thereof to thereby clamp the wall of the hose upon said stem.

3. A hose-coupling including a substantially cylindrical externally grooved stem adapted to enter the end of a hose, a member terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to thereby permit the said free end portions to be moved bodily radially to engage hose of considerably different outer diameters while the inner faces thereof accommodate themselves to the contour of the opposed surface of the hose to thereby clamp the wall of the hose upon said stem, and a member operatively associated with said fingered member for engaging said fingers to force and maintain said free end-portions thereof in engagement with said hose.

4. A hose-coupling including a member having an end-wall provided with a central opening and terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to thereby permit the said free end portions to be moved bodily into engagement with hose of considerably different outer diameters and accommodate themselves to the contour of the opposed surface of the same throughout their length, and a stem for entering the hose adapted to project through said opening for coaction with said fingers to clamp the hose.

5. A hose-coupling including a member having an end-wall provided with a central opening and terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to thereby permit the said free end portions to be moved bodily into engagement with hose of considerably different outer diameters and accommodate themselves to the contour of the opposed surface of the same throughout their length, and a stem for entering the hose adapted to project through said opening for coaction with said fingers to clamp the hose said opening and said stem arranged to prevent rotation of the latter within the former.

6. A hose-coupling including a member having an end-wall provided with a central opening and terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to thereby permit the said free end portions to be moved bodily into engagement with hose of considerably different outer diameters and accommodate themselves to the contour of the opposed surface of the same throughout their length, and a stem for entering the hose adapted to project through said opening and a collar between the ends of said stem to limit the longitudinal movement of the latter in one direction relatively to said fingered member.

7. A hose-coupling including a member having an end-wall provided with polygonal opening and terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to thereby permit the said free end portions to be moved bodily into engagement with hose of considerably different outer diameters and accommodate themselves to the contour of the opposed surface of the same throughout their length and a stem having a polygonal end portion for engaging in said opening and a substantially cylindrical grooved portion for engagement in the hose for coaction with said fingers to clamp said hose.

8. A hose-coupling including a member having an end-wall provided with a polygonal opening and terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to thereby permit the said free end portions to be moved bodily into engagement with hose of considerably different outer diameters and accommodate themselves to the contour of the same throughout opposed surface of the same throughout their length and a stem having a polygonal end portion for engaging in said opening and a substantially cylindrical grooved portion for engagement in the hose for coaction with said fingers to clamp said hose, there being a stop formation between the ends of said polygonal portion for engaging the end wall of said member on the side facing said fingers.

9. A hose-coupling including a substantially cylindrical externally grooved stem adapted to enter the end of a hose, and having a polygonal end portion, a member having an end wall provided with a central polygonal opening to receive and engage the polygonal portion of said stem and terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to permit the said free end portions to be moved bodily radially to engage hose of considerably different outer diameters while the inner faces thereof are maintained in position to present a substantially cylindrical surface common to all thereof to thereby clamp the hose upon the portion of the stem disposed therein and a member operatively associated with said fingered member for engaging said fingers to force and maintain said free end-portions thereof in engagement with said hose.

10. A hose-coupling including a substantially cylindrical externally grooved stem adapted to enter the end of a hose, and having a polygonal end portion, a member having an end wall provided with a central polygonal opening to receive and engage the polygonal portion of said stem and terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to permit the said free end portions to be moved bodily radially to engage hose of considerably different outer diameters while the inner faces thereof are maintained in position to present a substantially cylindrical surface common to all thereof to thereby clamp the hose upon the portion of the stem disposed therein and a member operatively associated with said fingered member for engaging said fingers to force and maintain said free end-portions thereof in engagement with said hose, said finger-flexing member including an exterior polygonal surface portion the latter and said polygonal surface portion of said stem adapted for engagement with wrenches for effecting a relative movement between said fingered member and said flexing member for effecting forced flexion of said fingers upon the hose.

11. A hose-coupling including a substantially cylindrical externally grooved stem adapted to enter the end of a hose, and having a polygonal end portion, a member having an end wall provided with a central polygonal opening to receive and engage the polygonal portion of said stem and terminating at one end in a plurality of flexible fingers, the inner faces of the latter normally presenting a discontinuous substantially cylindrical surface, said member and fingers constituting a single, integral structure, said fingers having substantially inflexible free end portions constituting substantial portions of said fingers, and sufficiently flexible shank-portions to permit the said free end portions to be moved bodily radially to engage hose of considerably different outer diameters while the inner faces thereof are maintained in position to present a substantially cylindrical surface common to all thereof to thereby clamp the hose upon the portion of the stem disposed therein, and a member having threaded engagement with said fingered member and provided internally with a surface formation adapted for engagement with said inflexible end portions of said fingers to contract the same upon the hose, said finger-flexing member including an exterior polygonal surface portion, the latter and said polygonal surface portion of said stem adapted for engagement with wrenches for effecting a relative movement between said fingered member and said flexing member for effecting forced flexion of said fingers upon the hose.

12. In a hose-clamp or coupling, a member for engaging the exterior surface of a hose, said member consisting of a single piece of metal and terminating at one end in a plurality of fingers having very flexible smooth shank-portions and inflexible end-portions, the latter presenting inner faces of substantial length for engaging the hose over a substantial length thereof as said inflexible end portions are moved bodily into engagement with hose of considerably different outer diameters and the shank portions thereof flexed, to substantially ogee curved formation to thereby permit said free end portions to accommodate themselves to the contour of the opposed surface of the hose.

13. A hose-clamp comprising a stem element to engage in the hose, a member comprising an externally threaded body-portion terminating at one end in flexible fingers devoid of threads for engaging the exterior surface of the hose, said fingers having inner faces normally disposed to present a discontinuous, substantially cylindrical surface, the outer end portions of said fingers, constituting more than half the length thereof, being substantially inflexible and each provided exteriorly between its ends with a ridge, the shank portions of said fingers being sufficiently flexible to permit said end portions to be moved bodily inwardly to engage hose of considerably different outer diameters, and an internally threaded sleeve having in part a smooth, tapered and stepped bore presenting surfaces adapted to engage said ridges of said fingers to force the same upon a hose as said sleeve is rotated in one direction relatively to said member.

14. A hose-clamp comprising a stem for engaging at one end in a hose and including a polygonal portion between its ends, a member comprising an externally threaded body portion terminating at one end in flexible fingers, devoid of threads, for engaging the exterior surface of the hose, said fingers having inner faces normally disposed to present a discontinuous, substantially cylindrical surface, the outer end portions of said fingers, constituting more than half the length thereof, being substantially inflexible and each provided exteriorly between its ends with a ridge, the shank portions of said fingers being sufficiently flexible to permit said end-portions to be moved bodily inwardly to engage hose of considerably different outer diameters, there being a polygonal central opening in said member to loosely receive and non-rotatably engage the polygonal portion of said stem while allowing the latter sufficient play to accommodate itself to inequalities in wall thickness of the hose, and an internally threaded sleeve having in part a smooth, tapered bore for engaging the ridges of said fingers to contract the same upon the hose as said sleeve is rotated relatively to said member and said stem in one direction.

15. A hose-clamp comprising a stem for engaging at one end in a hose and including a polygonal portion between its ends, a member comprising an externally threaded body portion terminating at one end in flexible fingers, devoid of threads, for engaging the exterior surface of the hose, said fingers having inner faces normally disposed to present a discontinuous, substantially cylindrical surface, the outer end portions of said fingers, constituting more than half the length thereof, being substantially inflexible and each provided exteriorly between its ends with a ridge, the shank portions of said fingers being sufficiently flexible to permit said end-portions to be moved bodily inwardly to engage hose of considerably different outer diameters, there being a polygonal central opening in said member to loosely receive and non-rotatably engage the polygonal portion of said stem while allowing the latter sufficient play to accommodate itself to inequalities in wall thickness of the hose, and an internally threaded sleeve having, in part, a smooth, tapered, and stepped bore for engaging the ridges of said fingers to contract the same upon the hose as said sleeve is rotated relatively to said member and said stem in one direction.

16. A hose-clamp comprising a stem including a polygonal portion, a stop-formation associated therewith, and a tapered portion for insertion into a hose, a member having a central polygonal opening for receiving said polygonal portion and coacting with the latter and said stop formation for preventing relative rotation and longitudinal movement in one direction of said stem, said member having an externally threaded portion and a plurality of longitudinally disposed flexible fingers, said fingers having inner faces normally disposed to present a discontinuous substantially cylindrical surface, the outer end portions of said fingers, constituting more than half the length thereof, being substantially inflexible and each provided exteriorly between its ends with a ridge, the shank portions of said fingers being sufficiently flexible to permit said end-portions to be moved bodily inwardly to engage hose of considerably different outer diameters, and an internally threaded sleeve having in part a smooth, tapered bore for engaging the ridges of said fingers to contract the same upon the hose as said sleeve is rotated relatively to said member and said stem in one direction.

17. A hose clamp including external hose-engaging means comprising a member equipped with a plurality of longitudinally extending fingers each having a substantially inflexible free end portion and a very flexible shank portion, the former being of substantial length and width to thereby permit the same to be brought into engagement with hose of considerably different outer diameters and accommodate themselves to the contour of the opposed hose surface, a nipple for engaging in the hose, means for preventing relative rotation between said nipple and fingers, and means rotatable relatively to the latter and said nipple for effecting contraction of said end portions of said fingers upon the hose.

18. A hose-clamp or coupling comprising a unitary, externally threaded member having an end-wall provided with a polygonal central opening and terminating at its other end in spaced flexible fingers adapted for forced engagement with a hose, a stem for engaging in the bore of the hose for coaction with said fingers to clamp the same, said stem having a polygonal end portion adapted to engage in said opening to prevent rotation thereof relatively to said fingered member, and an internally threaded member having an internal wall formation for engaging and contracting said fingers on the hose as it is rotated in one direction relatively to said fingered member while in threaded engagement therewith, said internally threaded member having a polygonal peripheral surface portion for engagement with a wrench and said polygonal portion of said stem adapted for engagement with a wrench to thereby permit forced relative rotation of said internally threaded member relatively to said fingered member, said polygonal portions of said stem and internally threaded member being respectively the portions of greatest dimensions diametrically thereof.

19. A hose-clamp or coupling comprising a unitary, externally threaded member having an end-wall provided with a polygonal central opening and terminating at its other end in spaced flexible fingers adapted for forced engagement with a hose, a stem for engaging in the bore of the hose for coaction with said fingers to clamp the same, said stem having a polygonal end portion adapted to engage in said opening to prevent rotation thereof relatively to said fingered member and equipped between the ends of said polygonal portion with a surface projection for limiting its longitudinal movement relatively to said fingered member, and an internally threaded member having an internal wall formation for engaging and contracting said fingers on the hose as it is rotated in one direction relatively to said fingered member while in threaded engagement therewith, said internally threaded member having a polygonal peripheral surface portion for engagement with a wrench and said polygonal portion of said stem adapted for engagement with a wrench to thereby permit forced relative rotation of said internally threaded member relatively to said fingered member, said polygonal portions of said stem and internally threaded member being respectively, the portions of greatest dimensions diametrically thereof.

20. A series of couplings each of which consists of an internal nipple and external clamping means interengaging therewith for coupling hose of various diameters, the hose engaging portions of said nipple and said clamping means varying in size proportionate to the diameter of the hose to be engaged, the nipples and clamping means being interchangeable throughout the entire series and the size of the interengaging portions on the nipple and clamping means being a constant for the entire series.

21. Hose coupling means adapted for coupling selectively anyone of a series of hose of different external diameters within predetermined limits, said means including an external clamping device equipped with flexible clamping elements and means for flexing the same adapted for cooperation to engage the hose externally, and a series of nipples for engaging in hose of varying sizes within said limits, interchangeably engageable with said external clamping means, the interengageable portions of said nipples and clamping means constituting a constant for the entire series.

22. Hose coupling means including a device for externally clamping the hose and a nipple for engaging in the hose, means for separably non-rotatably engaging the nipple with the clamping device, the latter interchangeably engageable with nipples of varying sizes to fit hose of various internal diameters and similar outer diameters, and any one of a series of said nipples interchangeably engageable with clamping devices to fit hose of varying outer diameters, the size of the means for separably non-rotatably engaging said nipples with said clamping devices constituting the constant for the several series.

23. Hose coupling means including a device for externally clamping the hose and a nipple for engaging in the hose, means for separably non-rotatably engaging the nipple with the clamping device, the latter interchangeably engageable with nipples of varying sizes to fit hose of various internal diameters and similar outer diameters, and any one of a series of said nipples interchangeably engageable with clamping devices to fit hose of varying outer diameters, the size of the means for separably non-rotatably engaging said nipples with said clamping devices constituting the constant for the several series, said means for separably non-rotatably engaging said clamping devices and nipples including means for limiting their relative longitudinal movement in one direction.

24. A hose coupling including a nipple, a member separably non-rotatably engaged therewith, a sleeve having threaded engagement with said member, and a series of elements for engaging a hose externally, the latter non-rotatably associated with said member and adapted for coaction with said sleeve for contraction upon the hose.

25. A hose coupling including a nipple, a member non-rotatably engaged therewith and separable therefrom by relative longitudinal movement in one direction, a sleeve having threaded engagement with said member, and a series of hose-clamping elements non-rotatably associated with said member and arranged for coaction with said sleeve for contraction upon the hose by rotation of said sleeve relatively to said member in one direction.

IRVING COWLES.